No. 815,080. PATENTED MAR. 13, 1906.
B. ENRIGHT.
MANUFACTURE OF HYDRAULIC CEMENT AND APPARATUS THEREFOR.
APPLICATION FILED OCT. 2, 1905.
2 SHEETS—SHEET 1.
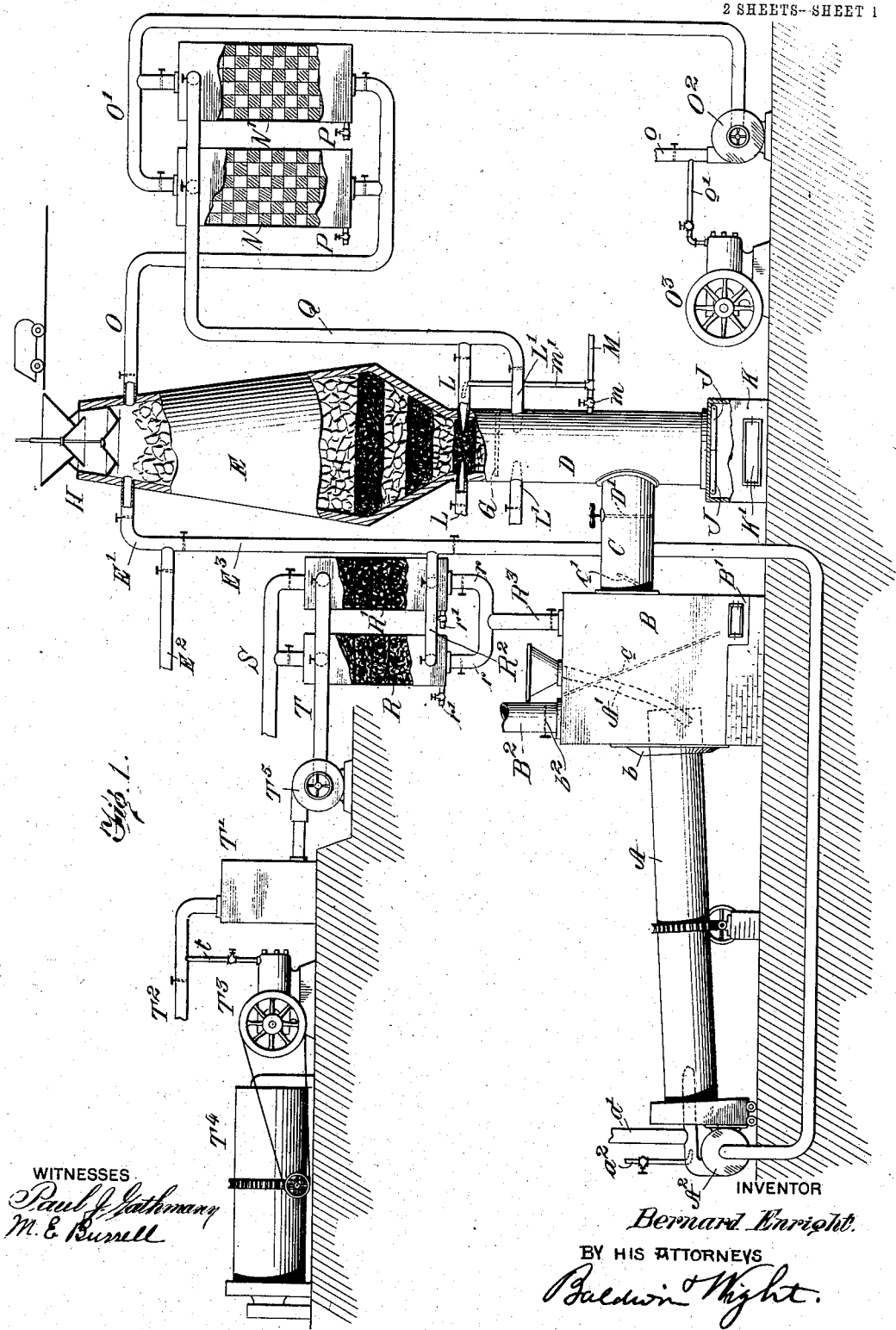
WITNESSES
Paul J. Jathmany
M. E. Burrell
INVENTOR
Bernard Enright.
BY HIS ATTORNEYS
Baldwin & Wight.

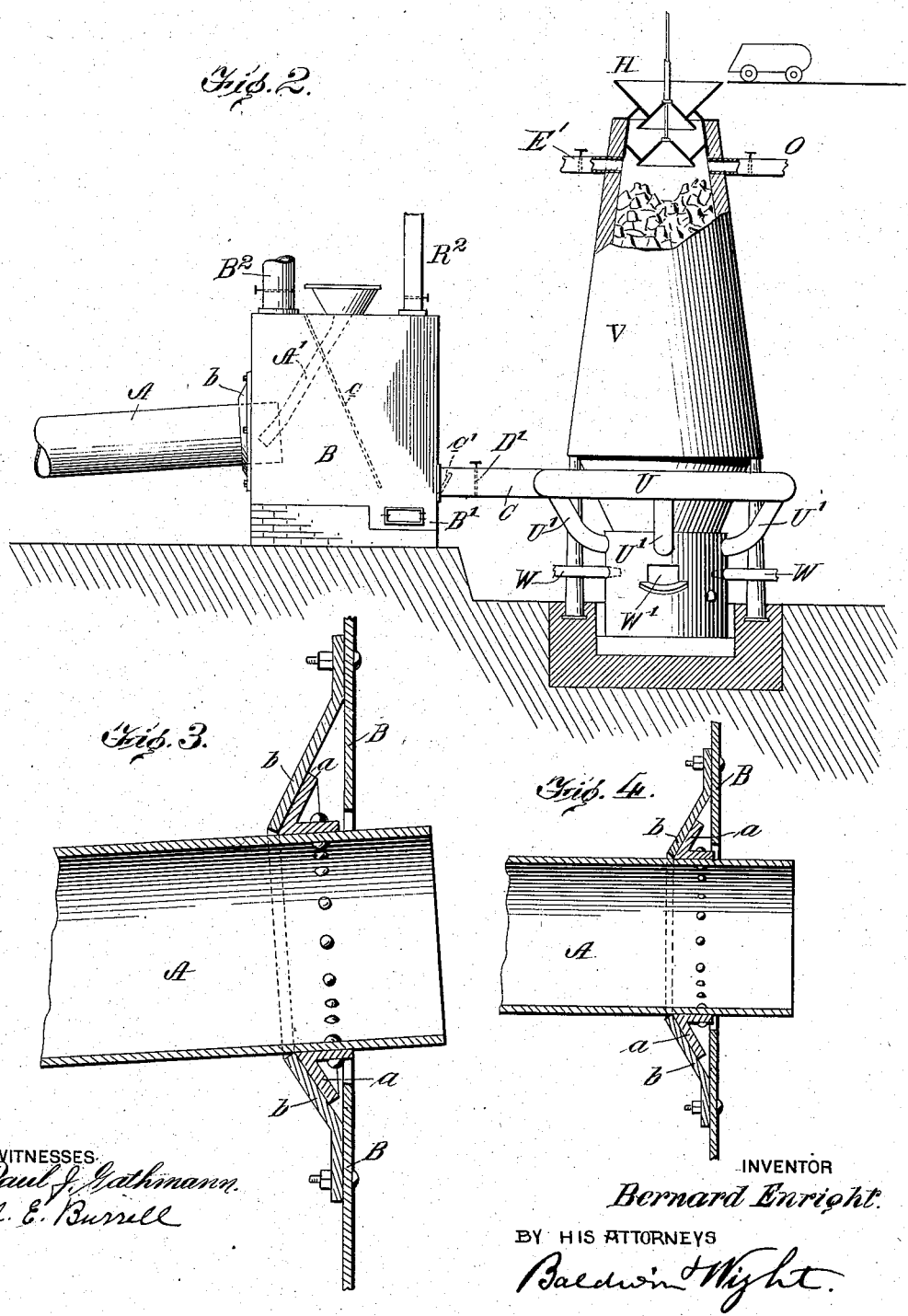

UNITED STATES PATENT OFFICE.

BERNARD ENRIGHT, OF FORDWICK, VIRGINIA.

MANUFACTURE OF HYDRAULIC CEMENT AND APPARATUS THEREFOR.

No. 815,080.          Specification of Letters Patent.          Patented March 13, 1906.

Application filed October 2, 1905. Serial No. 281,005.

*To all whom it may concern:*

Be it known that I, BERNARD ENRIGHT, analytical chemist, a citizen of the United States, residing at Fordwick, in the county of Augusta and State of Virginia, have invented certain new and useful Improvements in the Manufacture of Hydraulic Cement and Apparatus Therefor, of which the following is a specification.

In the manufacture of Portland cement by the rotary-kiln process there has heretofore been great waste of fuel and heat, owing principally to the fact that the rapid and intense combustion required for properly clinkering the cement material results in a large volume of heated gases passing through the stack of the furnace. The cement-rock or carbonate of lime burned in the rotary kiln gives off a large volume of carbon dioxid, which is an incombustible gas and which generally goes to waste, although it has been proposed to convert this gas into carbon monoxid, which is a combustible gas, and to use such gas for various purposes, either by returning it to the kiln, storing it in gasometers, or enriching it for illuminating purposes. I have found that great economy in the manufacture of Portland and other cements results from causing the gases from a rotary kiln to pass through a vertical kiln charged with alternate layers of cement-rock, limestone, and the like and a fuel, such as coal or coke.

By properly regulating the temperature in the vertical kiln and by properly controlling the chemical combinations therein the carbon dioxid passing from the rotary kiln and through the vertical kiln may be converted into carbon monoxid and commingled or combined with the carbon-monoxid produced from the charge in the vertical kiln. I have also found that the charge of cement rock or limestone thus treated in the vertical kiln is rendered friable or suitable for grinding and is in better condition for treatment in the rotary kiln, where the clinkering is performed.

The gases issuing from the vertical kiln are largely composed of carbon monoxid. The nitrogen and other such gases need not be considered; but there is also some carbon dioxid present. This can be converted into carbon-monoxid by being passed through incandescent fuel, as in a gas-producer. Such gases issuing from the vertical kiln, either with or without being passed through a gas-producer, may be employed to operate gas-engines, may be stored for use as needed, may be employed to heat steam-boilers, may be returned to the rotary kiln, or may be enriched for illuminating purposes.

In case the temperature of the gas issuing from the vertical kiln is too great it can be drawn through absorbers, where the temperature of the gas will be reduced, and these absorbers may be employed to raise the heat of the air admitted to the vertical kiln to promote combustion therein.

The temperature in the vertical kiln may be regulated and some hydrogen may be supplied, if needed, by the introduction of steam in said kiln, and the gases issuing from the kiln may be purified, if necessary, by being passed through a scrubber. I have found also that the products of combustion issuing from a rotary kiln may be employed to assist in producing slag for slag cement in a suitably-formed kiln or furnace, and, indeed, these gases may be employed in furnaces having ordinary blast-furnace charges.

In the accompanying drawings, Figure 1 shows diagrammatically an apparatus embodying my improvements and for practicing my process for the manufacture of Portland or hydraulic cement. Fig. 2 illustrates an apparatus for the manufacture of slag cement or for utilizing the products of combustion from a rotary kiln in a blast-furnace. Fig. 3 is a detail view, on an enlarged scale, showing devices for providing an air-tight joint where the rotary kiln enters the housing or dust-separating chamber. Fig. 4 is a detail view illustrating a modification of such devices.

The rotary kiln A may be of any approved type. Fuel in the form of gas, oil, or powdered coal may be supplied at $a'$, and air may be admitted at $a^2$. The upper or gas-discharging end of the kiln extends into a casing or housing B, which communicates, through a flue C, with a shaft D, forming the lower part of the vertical kiln E. The cement-forming material may be supplied to the kiln through a conveyer $A'$.

It is important that no air shall enter at the joint of the kiln A and housing B, because if the draft through the vertical kiln is too free an undesirable amount of air will be drawn into the apparatus, and, on the other hand, if the draft through the vertical kiln is choked or is impeded a back pressure might result which would force the products of combustion around the outside of the rotary kiln. I therefore provide an air-tight connection which preferably, as shown in Fig. 3, consists of a ring $a$, secured to the kiln A, and a ring $b$, secured to the housing B. It will be observed that the ring $a$ is inclined relatively to the adjacent wall of the housing and fits the kiln tightly. It has an inclined periphery which fits snugly the ring $b$. The contacting surfaces are made smooth or are machined so as to run free without permitting the ingress or egress of air or other gases. The same result may be obtained by inclining the wall of the housing B, as indicated in Fig. 4, and arranging the rings in the manner shown.

Baffle-plates $c\ c'$ are employed to arrest the dust, or a large portion of it, entering the housing and to direct it into a trough B', from which it may be removed automatically or otherwise in any suitable way.

The housing or dust-chamber B is provided with a stack $B^2$, having a valve $b^2$. This stack, which I call the "emergency-stack," is only used when for any reason it is undesirable to pass the products of combustion into the vertical kiln or when it is desired to relieve the pressure in the chamber B. The vertical kiln may be cut off from the housing by a valve D'. Preferably the vertical kiln E is of the form shown, resembling in general outlines an old-fashion lime-kiln or a blast-furnace. It is provided with a grate G, on which the charge rests, and charging devices H, similar to those used in blast-furnaces, are preferably employed.

The charge in the vertical kiln preferably consists of alternate layers of coke, coal, or other like suitable fuel, and cement-rock, cement-rock and limestone, or any other suitable mixture of like nature. The material is preferably charged in rather large lumps, so as to permit a suitable draft. Combustion may be started in the charge by aid of the products of combustion from the rotary kiln, and the products of combustion from the vertical kiln pass out through the outlets E' and O.

At the lower portion of the shaft D, I arrange hinged doors J, below which is a compartment K. The burned lime-rock or cement-rock is received on the doors J while the door K' of the compartment K is closed. Then these doors J are lowered, emptying the charge of burned lime or cement rock into the compartment K, and then the doors J are raised, affording an air-tight closure. The burned material may then be removed from the compartment K, ground in the usual way, and fed to the rotary kiln, where the clinkering is performed. I have found that the material burned or partially calcined in this way is not only more easily ground, but it is more readily converted into clinker in the rotary kiln and less fuel is required therein.

Air may be admitted to promote combustion through the twyers L L', and steam may be admitted at $m$ in order to reduce, if necessary, the temperature in the vertical kiln and to supply hydrogen, if needed. The twyers may be assisted by means of steam-jets supplied by the branch pipe M' from the main steam-pipe M.

If the heat of the gases issuing from the vertical kiln is too great, the temperature may be reduced by passing them through absorbers N N', which are connected with the pipe or passage O in such manner that either one of them can be used to the exclusion of the other, and there are separate outlets, so that either one may be cut off from the pipe O', which conveys the gas from the absorbers. Preferably the absorbers consist, as indicated, of casings filled with firebrick, resembling ordinary regenerators. Each absorber is provided with an air-inlet P. Assuming that the absorber N is connected with the supply-pipe O, the hot gas may be made to pass through the absorber and out into the outlet-pipe O'. The absorber N' is at this time disconnected from the pipes O and O'; but its air-inlet may at this time be open and air may enter the absorber through the inlet P and pass to the pipe Q, which feeds the twyers L L'. In this way the heat of an absorber may be reduced, while at the same time the temperature of the air fed to the vertical kiln may be increased. After the temperature of the absorber N' is reduced and the temperature of the absorber N has been too much increased the valves may be shifted and the absorber N' used to reduce the temperature of the gases from the vertical kiln, while the absorber N is employed to raise the temperature of the air fed to the twyers L L'. After the temperature of the gases has been thus reduced they may pass through the pipe O' and through a fan or blower $O^2$ and either pass through the pipe $o$ to a gasometer or other suitable place for use or through a branch pipe $o'$ to a gas-engine $O^3$.

The natural draft of the vertical kiln may be sufficient so that artificial means, such as a fan or blower, may be unnecessary.

While the gases issuing from the vertical kiln largely consist of carbon monoxid, any carbon dioxid which they contain may be converted into carbon monoxid by being passed through incandescent coke, coal, or charcoal. For this purpose I preferably employ two chambers R R', having air-inlets $r'$, and which are connected with the housing B by valved passages $r\ R^3$, and both of the chambers are connected by valved passages with an outlet-pipe S. The arrangement, as clearly indicated, is such that the products of combustion, or some of them, from the rotary kiln may be passed through the chambers R R' for the purpose of raising the fuel therein to incandescence when starting. The chambers may be used alternately. For instance, the chamber R may be connected with the chamber B and the fuel in the chamber R raised to incandescence while the chamber R' is being used as a gas-producer in the manner presently explained. Both the chambers R R' are connected with a pipe R², which communicates with a pipe E³, connected with the outlet-pipe E'. The gas from the vertical kiln may be passed through a pipe E² and be consumed or stored without further treatment, or the gases may be passed through the pipes E³ and R² to the gas-producers R R', where any carbon dioxid which they contain may be converted into carbon monoxid or producer-gas. Such gas is conveyed through a pipe T to a fan T⁵, which preferably delivers to a gas-scrubber T', from which the gas may pass by means of a pipe T², and this may have a branch pipe t, leading to a gas-engine T³, which may be employed to operate a tube-mill T⁴ or any other machine or apparatus in the plant. If desired, the gas from the vertical kiln may be conveyed, as indicated, to the rotary kiln, a fan A² being employed to assist its passage thereto.

The vertical kiln E may be operated at a comparatively low temperature—i. e., a temperature only high enough for the expulsion of carbon dioxid from limestone, cement-rock, &c., and for the conversion of such carbon dioxid into carbon monoxid, as after carbon dioxid is produced it will be largely if not wholly reduced to carbon monoxid during its passage through the kiln. This vertical kiln may be also operated at a somewhat higher temperature to promote the necessary chemical reactions between lime, silica, and alumina to produce natural or Portland cement from cement-rock, cement-rock and limestone, or other suitable material.

In order to produce slag for slag cement or Passow cement, apparatus such as indicated in Fig. 2 is preferably employed. This apparatus is similar in many respects to that before described; but the vertical kiln or furnace V is of the ordinary blast-furnace type. W indicates the twyers, and W' the cinder-notch. The products of combustion pass from the chamber B through the conduit C to a bustle-pipe U, having branches U', that deliver near the bottom of the boshes or at the upper part of the hearth. In this instance a much higher temperature should be maintained. The carbon dioxid from the rotary kiln is converted into carbon monoxid in its passage through the furnace V and commingles with the carbon monoxid generated from the furnace charge whether this charge be an ordinary blast-furnace charge or one containing cement-forming material.

It will be observed that the two kilns shown in Fig. 1 operate under opposite conditions in some respects. Sufficient air is admitted to the rotary kiln to produce an oxidizing atmosphere in which the carbon dioxid liberated from the charge is substantially unchanged and the fuel is converted wholly or to a very large extent into carbon dioxid, while in the vertical kiln a much smaller amount of air is admitted, producing a reducing-atmosphere in which the fuel burned and the carbon dioxid liberated from the charge, as well as the carbon dioxid from the rotary kiln, are reduced largely if not wholly to carbon monoxid during their passage through the kiln. This feature of my invention is important. Heat in the vertical kiln is preferably concentrated near the bottom thereof. Sufficient oxygen is supplied to produce carbon dioxid in the lower portion of the kiln, while care is taken that there shall be a deficiency of oxygen in the upper portion of the kiln in order that carbon monoxid may be formed.

I claim as my invention—

1. The herein-described process which consists in causing the highly-heated gaseous products of combustion and decomposition from a rotary clinker-forming cement-kiln to pass through a $CO_2$-producing charge containing carbon in a kiln or furnace in which the temperature and conditions are such as to cause $CO_2$ to be liberated from the charge and the carbon dioxid issuing from the rotary kiln and the carbon dioxid formed or set free in the vertical kiln or furnace to be converted (or largely so) into carbon monoxid then collecting or utilizing the carbon monoxid thus formed and collecting and using the cement-forming material thus produced.

2. The herein-described process which consists in causing the highly-heated gaseous products of combustion and decomposition from a rotary clinker-forming cement-kiln to pass through an incandescent charge of fuel and cement-producing material such as lime-rock or cement-rock in a vertical kiln, causing the cement-producing material to be partially or completely calcined effecting the change of the carbon dioxid issuing from the rotary kiln into carbon monoxid and collecting for use the calcined cement-producing material thus formed.

3. The herein-described process which consists in causing the highly-heated gaseous products of combustion and decomposition from a rotary clinker-forming kiln to pass through an incandescent charge of fuel and cement-producing material in a vertical kiln, causing the cement-producing material to be partially or completely calcined and effecting a change of the carbon dioxid issuing from the rotary kiln and the carbon dioxid formed or set free at the lower part of the vertical kiln into carbon monoxid then collecting or utilizing the carbon monoxid thus produced and collecting for use the cement-forming material thus produced.

4. The herein-described process which consists in passing the highly-heated gaseous products of combustion and decomposition from a clinker-forming rotary cement-kiln through a charge of incandescent fuel and cement-forming material maintained at such temperature and under such conditions as to convert the carbon dioxid in said products of combustion and the carbon dioxid from the charge in the vertical kiln into carbon monoxid at the same time partially or completely calcining the cement-forming material and in collecting for use the calcined or partially-calcined cement-forming material.

5. The herein-described process which consists in passing the highly-heated gaseous products of combustion and decomposition from a clinker-forming rotary cement-kiln through a charge of incandescent fuel and cement-forming material in a vertical kiln producing a reducing-atmosphere in said vertical kiln to change the carbon dioxid received from the rotary kiln and the carbon dioxid formed or set free in the vertical kiln into carbon monoxid and at the same time partially or completely calcining the cement-forming material then collecting or utilizing the carbon monoxid thus produced and collecting for use the calcined cement-forming material.

6. The process herein described which consists in passing the highly-heated gaseous products of combustion and decomposition from a clinker-forming rotary cement-kiln through a charge of cement-producing material and a relatively small proportion of incandescent fuel to largely convert the carbon dioxid in the products of combustion into carbon monoxid and then passing the resulting gases through incandescent fuel to reduce any carbon dioxid in said gases to carbon monoxid.

7. The combination of a rotary clinker-forming cement-kiln, a separating-chamber connected therewith, a vertical kiln connected with said separating-chamber, chambers containing coke or similar fuel also connected with the separating-chamber and with the vertical kiln and devices for directing the products of combustion from the rotary kiln into either of said fuel-containing chambers and for directing gases issuing from the vertical kiln into either of said fuel-containing chambers.

8. The combination of a rotary clinker-forming cement-kiln, a separating-chamber connected therewith, a vertical kiln connected with said chamber and containing fuel and cement-producing material, an emergency-stack in the separating-chamber air-blast and steam-supplying means at the lower portion of the vertical kiln and means for carrying off the gases issuing from the vertical kiln.

9. The combination of a rotary clinker-forming cement-kiln, a vertical kiln connected therewith, air-inlets in the vertical kiln, absorbers connected with the vertical kiln and also with the air-inlets, means for passing the gases issuing from the vertical kiln through the absorbers, devices for passing through the absorbers the air admitted to the vertical kiln, and means for supplying steam to the lower portion of the vertical kiln.

10. The combination of a rotary clinker-forming cement-kiln, a vertical kiln connected with the rotary kiln, a compartment below the vertical kiln for receiving burned rock, doors separating this compartment from the vertical kiln, an emergency-stack connected with the rotary kiln and a damper interposed between the vertical kiln and the cement-kiln.

11. The combination of a rotary clinker-forming cement-kiln, a separating-chamber connected therewith, a vertical kiln connected with said separating-chamber, means surrounding the rotary kiln to exclude air from the separating-chamber, an emergency-stack in the separating-chamber, and means cutting off the vertical kiln from the separating-chamber.

12. The combination of a rotary clinker-forming cement-kiln, a separating-chamber connected therewith, a vertical kiln connected with said separating-chamber, a ring having an inclined periphery secured to the rotary kiln, and a ring having an inclined periphery fitting the first-mentioned ring and attached to the separating-chamber.

In testimony whereof I have hereunto subscribed my name.

BERNARD ENRIGHT.

Witnesses:
NEWTON C. WATTS,
AUBREY BURNETT.